United States Patent
Weesner et al.

(10) Patent No.: US 7,105,940 B2
(45) Date of Patent: Sep. 12, 2006

(54) MOBILE RENEWABLE ENERGY GENERATOR

(75) Inventors: Brent Edward Weesner, Houston, TX (US); David Mackay McMillan, Hummelstown, PA (US)

(73) Assignee: General Electric Company, Schenectady, NY (US)

(*) Notice: Subject to any disclaimer, the term of this patent is extended or adjusted under 35 U.S.C. 154(b) by 114 days.

(21) Appl. No.: 10/708,914

(22) Filed: Mar. 31, 2004

(65) Prior Publication Data
US 2005/0218657 A1 Oct. 6, 2005

(51) Int. Cl.
F03D 9/00 (2006.01)
F03D 3/00 (2006.01)

(52) U.S. Cl. .............. 290/44; 290/55; 322/1
(58) Field of Classification Search .......... 290/1 R, 290/1 A, 44, 55; 322/1; 60/325, 545
See application file for complete search history.

(56) References Cited

U.S. PATENT DOCUMENTS

| | | | | |
|---|---|---|---|---|
| 4,159,427 A * | 6/1979 | Wiedemann | ................ | 290/55 |
| 4,261,329 A * | 4/1981 | Walsh et al. | ................ | 126/569 |
| 4,289,970 A * | 9/1981 | Deibert | .................. | 290/44 |
| 4,314,160 A * | 2/1982 | Boodman et al. | .............. | 290/55 |
| 4,371,346 A * | 2/1983 | Vidal | .................. | 440/8 |
| 4,553,037 A * | 11/1985 | Veazey | .................. | 290/55 |
| 4,590,718 A * | 5/1986 | Angeloff | ................ | 52/116 |
| 5,610,450 A | 3/1997 | Saeki et al. | ................ | 307/46 |
| 5,920,127 A * | 7/1999 | Damron et al. | .............. | 290/44 |
| 5,969,501 A * | 10/1999 | Glidden et al. | ............. | 320/101 |
| 5,999,864 A | 12/1999 | Thiel et al. | ................ | 707/22 |
| 6,194,793 B1 | 2/2001 | Fisher et al. | .............. | 307/66 |
| 6,201,181 B1 * | 3/2001 | Azzam et al. | ............. | 136/244 |
| 6,372,978 B1 | 4/2002 | Cifaldi | .................. | 136/248 |
| 6,695,536 B1 * | 2/2004 | Sanchez Gomez | .......... | 405/76 |
| 6,740,988 B1 * | 5/2004 | Tseng | .................. | 290/44 |
| 6,791,206 B1 * | 9/2004 | Woodbridge | .............. | 290/53 |
| 6,952,058 B1 * | 10/2005 | McCoin | ................ | 290/44 |
| 2002/0060500 A1 | 5/2002 | Lafferty | ................. | 310/11 |

* cited by examiner

Primary Examiner—Nicholas Ponomarenko
(74) Attorney, Agent, or Firm—Cantor Colburn LLP (57) ABSTRACT

A method and apparatus for a portable renewable energy generator includes; a movable platform adapted for one of towing and transport to a remote area, a redundant renewable energy source generator including a wind energy extraction device configured for transport on the movable platform, and a battery system operably connected to the redundant renewable energy source generator. The battery system is configured to store electrical energy generated by the redundant renewable energy source generator.

7 Claims, 5 Drawing Sheets

MOBILE RENEWABLE ENERGY GENERATOR

BACKGROUND OF THE INVENTION

This invention relates to a portable renewable energy source generator, and more particularly, relates to a portable renewable energy source generator providing wind and photovoltaic electrical generation.

There is increasing agreement around the world that people would benefit from a change from nuclear fuels, coal, oil and gas as energy sources to clean indefinitely renewable and locally available natural energy sources such as sunshine, wind, and flowing water to generate useful electrical power. The use of each one of sunshine, wind and flowing water as an energy source by itself has its strengths and weaknesses, such as time of day or night, season, weather conditions, location of resources near to points of use, special land and directional and topographic requirements, the amount and cost of required real estate, aesthetic considerations, safety considerations, noise considerations, etc. However, when these natural and manmade sources of energy are used in combination to generate electrical power, they can go a long way in solving another major and heretofore expensive problem, namely that of providing a reasonably steady and continuous source of electricity for storage in batteries and other energy storage devices and/or for use in powering lamps, motors, pumps, and other devices.

The last few years have seen the development of renewable energy (RE) systems, mainly wind-based and/or solar-based systems. These renewable energy systems are intended to help fight against energy pollution and resource depletions.

These renewable energy (RE) systems are highly transient energy sources and exhibit strong variations in their energy outputs. Thus, they require proper means to store the energy produced in period of low demand in order to stabilize the output when the demand is high. At present, the storage of the excess energy relies mostly on batteries (Fisher, Jr., "Apparatus and method for charging an energy storage source", U.S. Pat. No. 6,194,793, Feb. 27, 2001; S. Mituo, S. Tsutomu, O. Hidekiyo, M. Hisafumi, "Power supply apparatus for efficiently utilizing battery and electronic apparatus using the power supply", U.S. Pat. No. 5,610,450, Jun. 29, 1995; T. O. Kent, B. Arthur J., "Method of power management for a hybrid powertrain system", U.S. Pat. No. 5,999,864, Apr. 23, 1997). Batteries typically lose 1–5% of their energy content per month.

Remote and sometimes temporary power requirements typically require the use of a mobile or portable gas or diesel powered generator or a renewable energy system may need to be constructed to provide the required power. Fossil fuels such as coal and oil are not renewable and their use may be increasingly limited by growing environmental concerns. The goal is to minimize dependence on fossil fuels.

Gasoline or diesel powered generators are the most common but require constant refueling (i.e., spill potential) and may require environmental permitting (i.e., air permit or petroleum storage permit). Wind turbines have been used, but only when mounted to fixed foundations. Solar panels have also been used when mounted to fixed foundations, or alone on small mobile units (i.e., roadside emergency units or for use in space).

Accordingly, there is a need for a source of power that can be moved from location to location, is not reliant solely on fossil fuel, does not cause or add to air pollution or noise pollution, and does not require environmental permitting.

BRIEF DESCRIPTION OF THE INVENTION

The above discussed and other drawbacks and deficiencies are overcome or alleviated in a system and method of transporting a redundant renewable energy source generator including a wind energy extraction device on a movable platform.

In an exemplary embodiment, a portable renewable energy generator includes a movable platform adapted for one of towing and transport to a remote area, a redundant renewable energy source generator including a wind energy extraction device configured for transport on the movable platform, and a battery system operably connected to the redundant renewable energy source generator. The battery system is configured to store electrical energy generated by the redundant renewable energy source generator.

In another embodiment, a method for production of continuous power from a renewable energy source is disclosed. The method includes configuring a mobile platform for one of towing and transport to a remote area; disposing a redundant renewable energy source generator including a wind energy extraction device on the movable platform; and disposing a battery system on the mobile platform. The battery system is operably connected to the redundant renewable energy source generator and is configured to store electrical energy generated by the redundant renewable energy source generator.

In one exemplary embodiment, solar and wind power hardware are mounted on a portable platform to create a portable electrical generator system. The system is a portable source of energy that utilizes solar and wind power via a photovoltaic array and one or more small wind turbines to charge a battery bank that is connected to an inverter such that either AC or DC power can be used. If environmental conditions dictate, and power use requirements are excessive, a backup generator may be mounted on the mobile platform to supplement the existing system. The backup generator will automatically charge the battery bank during times of low charge or high power consumption.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures.

DETAILED DESCRIPTION OF THE INVENTION

Figures 1, 2:
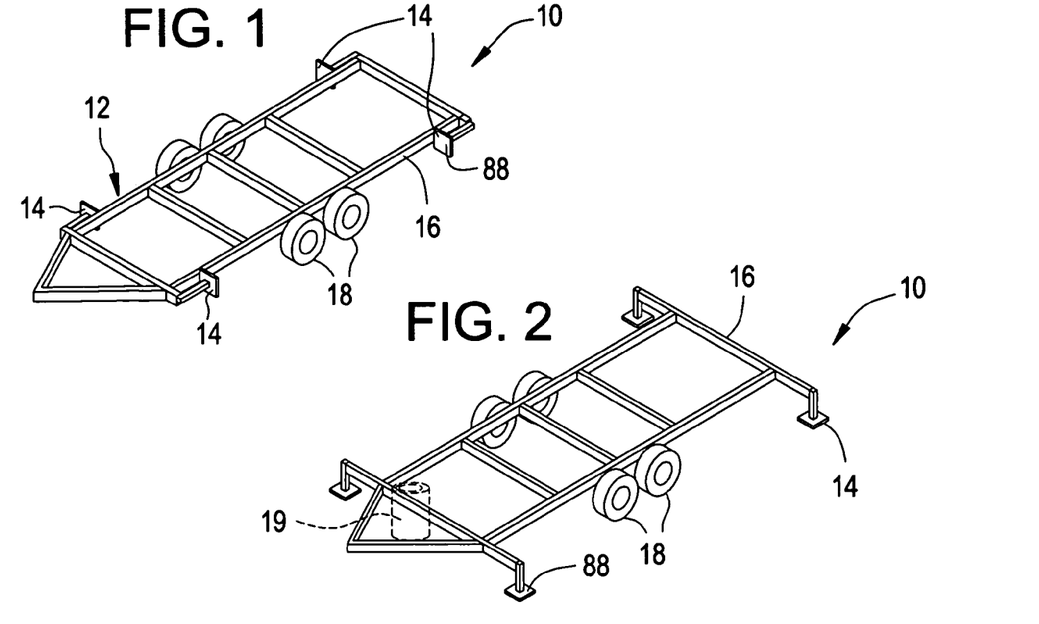
FIG. 1 is a front perspective view of an exemplary embodiment of a portable renewable energy generator system trailer including four support jacks extending from a chassis in a transport position.
FIG. 2 is a front perspective view of FIG. 1 illustrating the support jacks in a standing position for stabilization of the trailer in accordance with an exemplary embodiment.

FIG. 1 illustrates an exemplary embodiment of a portable renewable energy generator system 10 having a movable or mobile platform configured as a trailer 12 in an exemplary embodiment. Trailer 12 includes four support jacks 14 extending from a chassis 16 defining trailer 12 in a transport position, while FIG. 2 illustrates the support jacks 14 in a standing position for stabilization of trailer 12. System 10 is made portable by mounting all of the associated components on the mobile trailer 12 having wheels 18 operably coupled thereto. In an exemplary embodiment, chassis 16 includes a dual axle configuration supporting two wheels 18 on each side of trailer 12. A double axle trailer 12 allows for highway use and is appropriately configured to accommodate all of the components of the portable renewable energy generator system 10 either attached thereto or stored therein permitting highway travel. However, a single axle, as well as more than a two axle configuration is also contemplated. Trailer 12 is constructed in accordance with standard roadway trailer specifications so it may be lawfully operated on roadways if necessary. FIG. 2 also illustrates a liquid propane (LP) tank 19 shown in phantom operably coupled to a front of the chassis for use by a backup generator (not shown).

Figure 3:
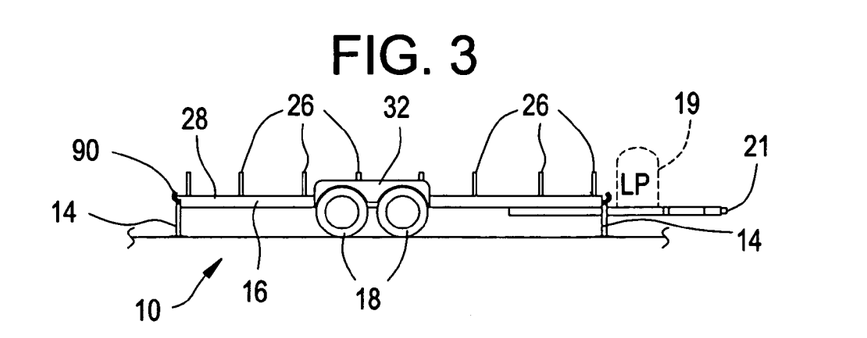
FIG. 3 is a side view of a trailer in a standing position illustrating a fender well disposed over each set of dual tires and solar panel support members extending from the chassis in accordance with another exemplary embodiment.
Figure 4:
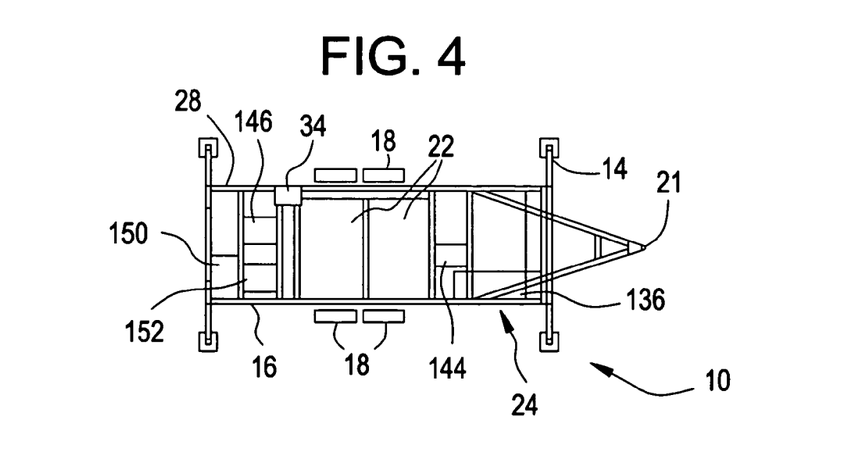
FIG. 4 is a top plan view of the trailer of FIG. 3 including two battery boxes supported by the chassis and a tower base plate for a wind turbine generator in accordance with an exemplary embodiment.
Figure 5:
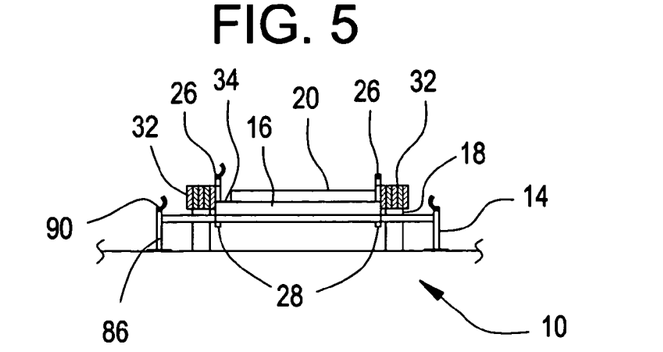
FIG. 5 is a rear elevation view of FIG. 4.

Referring now to FIGS. 3–5, a trailer mount and racking structure for the portable renewable energy generator power system 10 made in accordance with an exemplary embodiment is indicated generally by the reference numeral 10. The trailer includes at least one box-like compartment 20 that is mounted on chassis 16 upon two pairs of wheels 18. A hitch 21 is provided at the trailer front for towing by a light truck or other suitable vehicle. Compartment 20 serves as a shelter for ancillary equipment that may include a battery system, a DC to AC inverter, an engine generator or fuel cell for peaking or supplemental power and associated control systems. In an exemplary embodiment, compartment 20 includes two battery boxes 22 and at least one separate ancillary box 24 (shown in phantom) for other ancillary equipment (see FIG. 4). Fuel, suitably propane but not limited thereto, for an optional backup generator is carried in at least one tank 19 that may be mounted at the front of the trailer as shown in FIG. 3. FIG. 3 also illustrates a plurality of mounting members 26 extending from one side frame 28 defining a length of chassis 16, however, a plurality of spaced apart mounting members 26 extend from both side frames 28 defining opposite sides of chassis 16 for pivotal attachment of a solar energy extraction device 30 (FIG. 6) discussed more fully herein. Both side frames 28 defining chassis 16 include a fender 32 depending therefrom aligned over each of two wheels 18 disposed on either side of trailer 12.

Referring now to FIGS. 4–9, the portable renewable energy generator power system 10 includes a tower base 34 operably coupled to chassis 16. Tower base 34 is configured to support a mast or tower assembly 36 erected thereon to mount a wind turbine 40 high enough above surrounding tress, for example, to generate usable electricity that can be stored in batteries 42 in battery compartments 22. Tower assembly 36 is shown erected on base 34 in a standing position in FIG. 6, while shown in a transport position in FIGS. 7 and 8. Although only one wind turbine 40 is shown, it is contemplated that any number of small wind turbines and associated tower structures can be employed suitable to the desired end purpose, if necessary. Moreover, although a wind turbine 40 is described, any wind energy extraction device is contemplated that is suitable to the desired end purpose.

Figure 7:
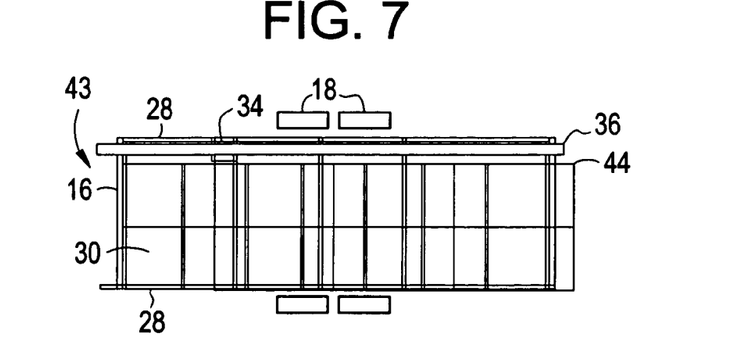
FIG. 7 is a top view of the trailer in a transport position illustrating the tower assembly stowed and the solar array folded upon itself for the transport position.
Figure 8:
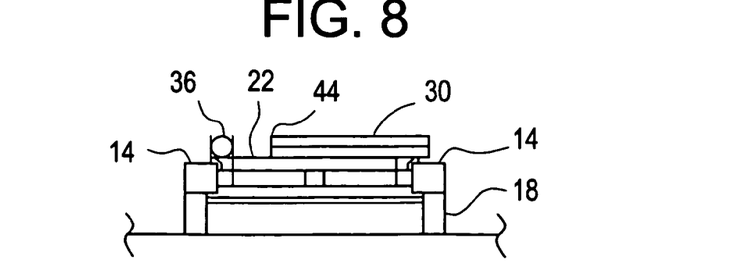
FIG. 8 is rear elevation view of FIG. 7 showing the support jacks retracted.

In the transport position best seen in FIGS. 7 and 8, tower assembly 36 is stowed above and/or to the side of battery compartments 22 in an area not occupied by folded solar array panels 30 along a length defining trailer 12. In an exemplary embodiment, two solar array panels are complementary configured and hingedly attached to each other along facing edges 44 through a rack structure supporting the same while an opposite edge 46 of one of the panels 30 is pivotally connected to the plurality of support members 26 extending from one side frame 28 of chassis 16. In an exemplary embodiment, tower assembly 36 includes a plurality of sectioned poles that are stowed between one side defining battery compartments 22 and support members 26 opposite pivotal attachment of solar array panel 30 best seen in FIGS. 8 and 10. In an alternative embodiment, tower assembly 36 includes a telescoping pole for wind turbine 40 heights extending to about 20 to about 30 feet, for example, but is not limited thereto. In another alternative embodiment, tower assembly 36 includes a lattice or trellis structure with one or more vertical poles and associated support infrastructure (e.g., lattice/trellis).

Figure 9:
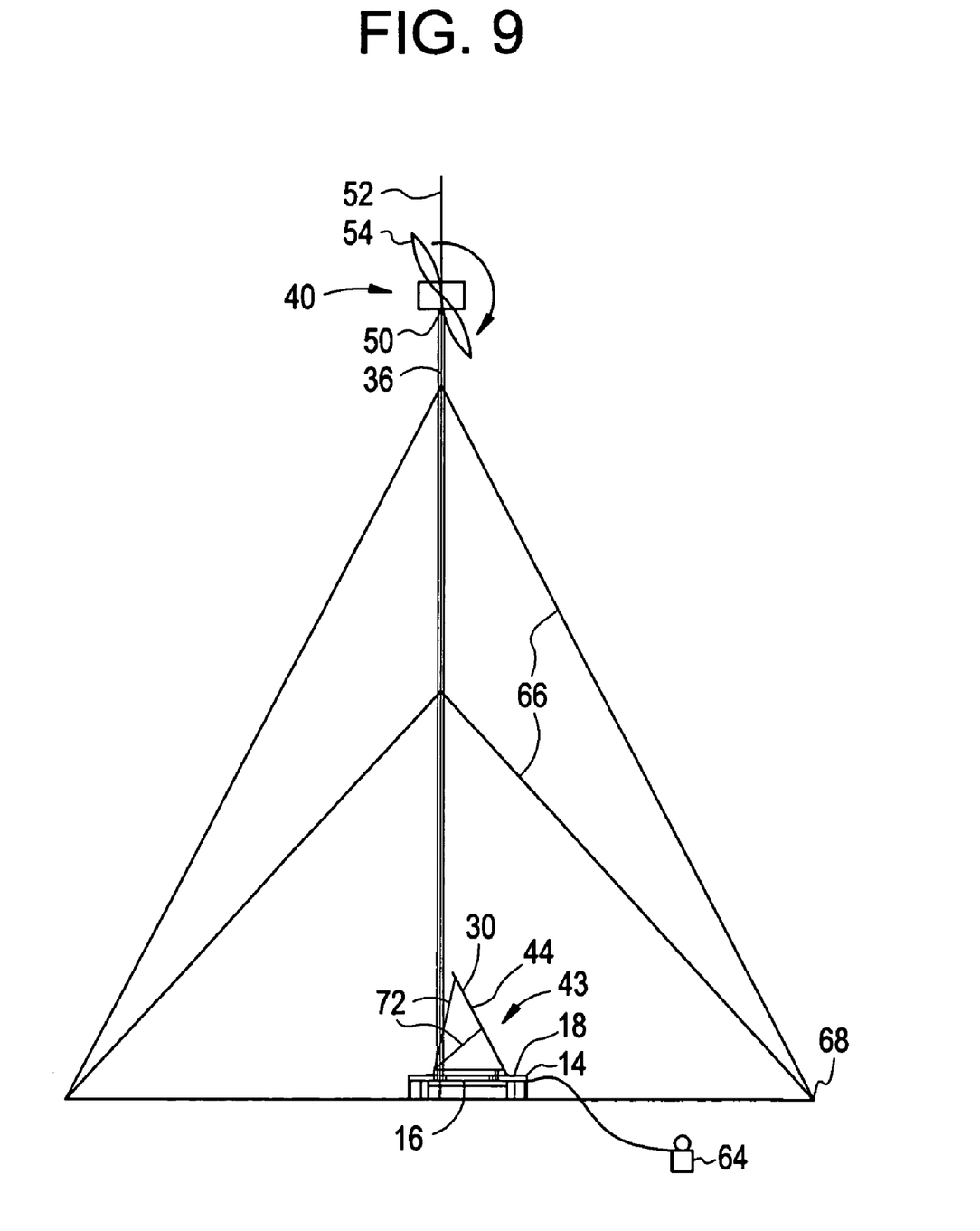
FIG. 9 is the view of FIG. 8 illustrating an extended solar array and extended wind turbine on the tower assembly supported by guy wires.
Figure 10:
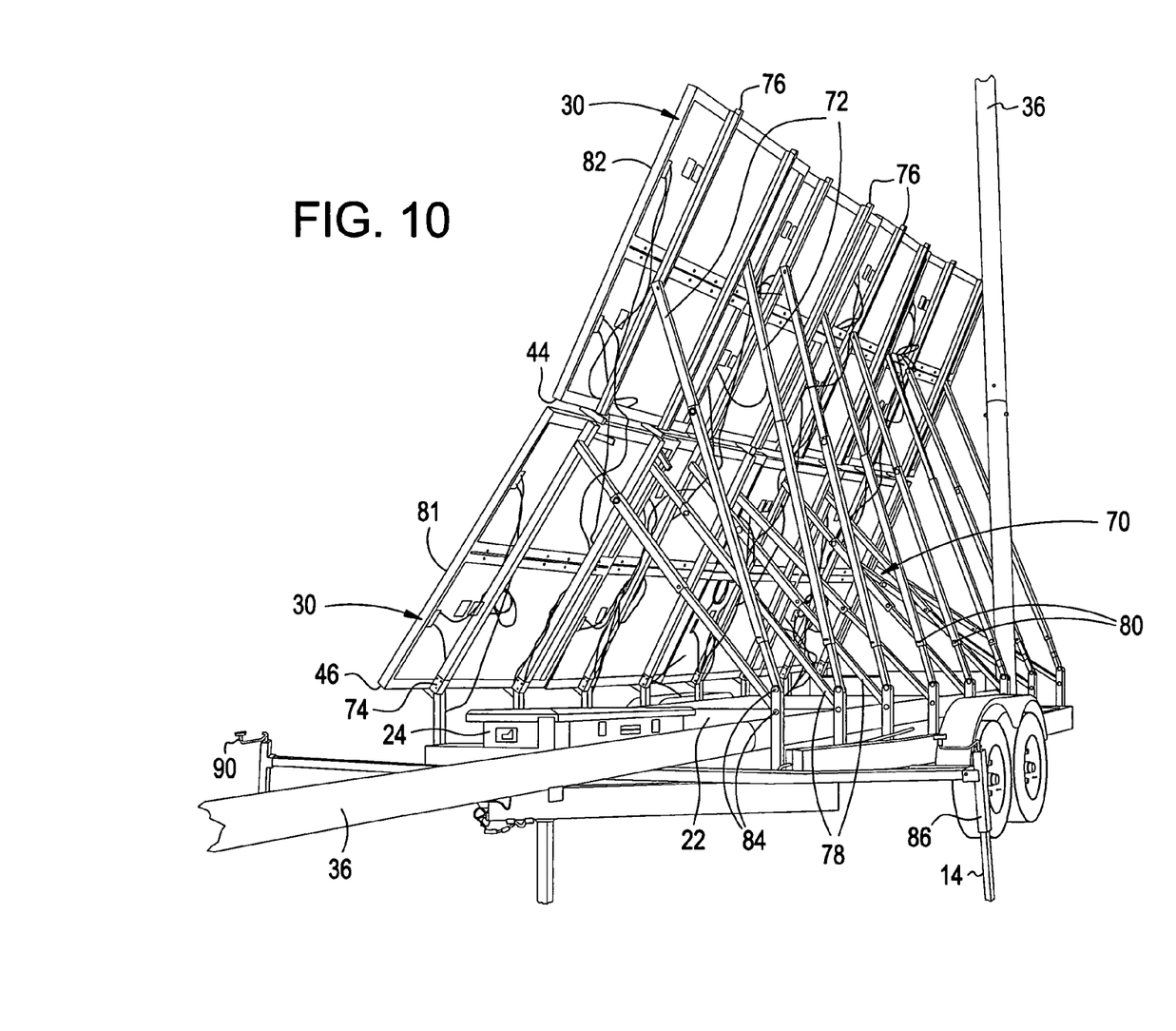
FIG. 10 is a partial perspective view of FIG. 9 illustrating one of two solar array panels pivotally coupled to support members extending from one side of the chassis and both solar array panels being supported by adjustable braces extending from support members extending from an opposite side of the chassis.
Figure 11:
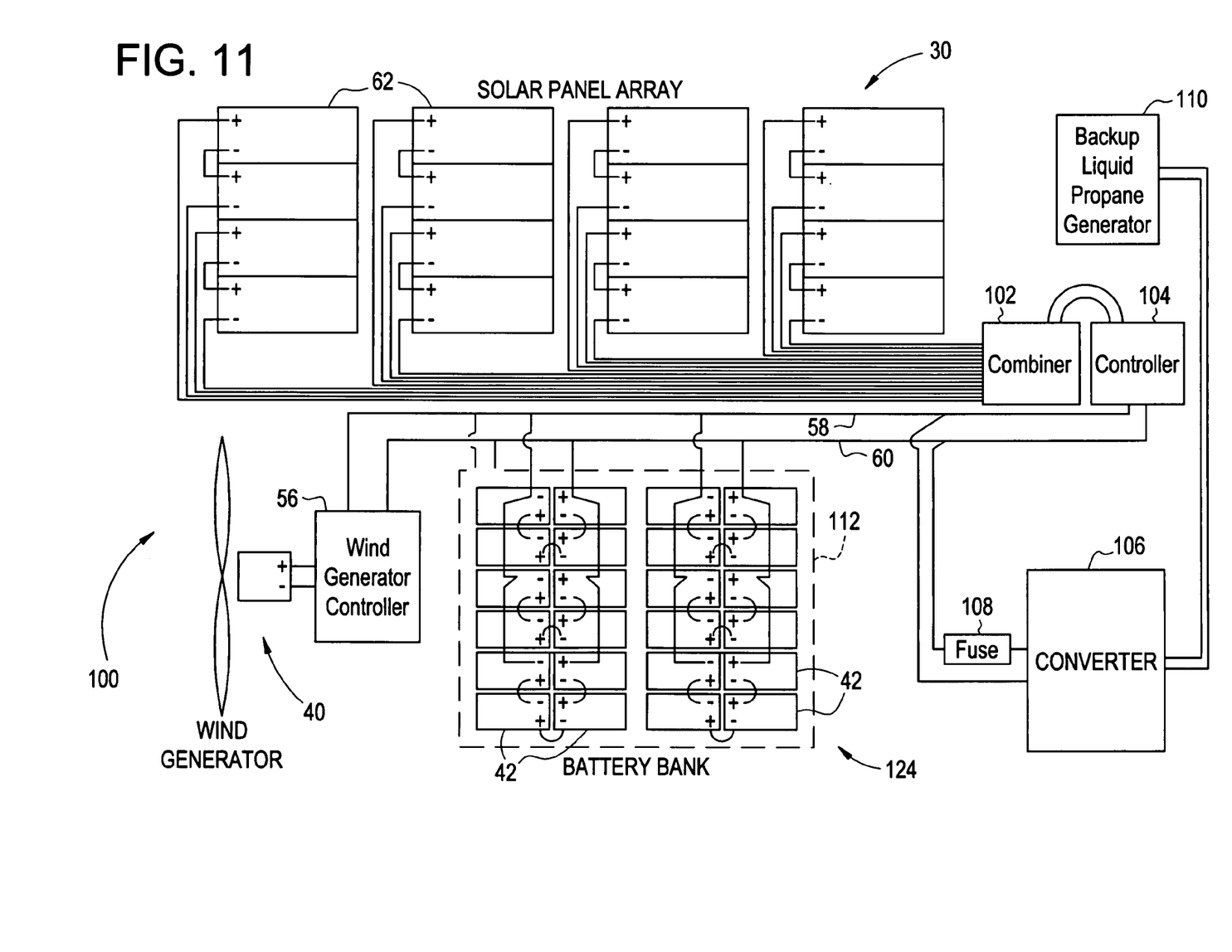
FIG. 11 is a schematic diagram of another exemplary embodiment of a mobile renewable energy generator including a backup liquid propane generator.

In the standing position best reflected in FIGS. 9 and 10, solar array panels 30 and wind turbine 40 are extended to convert solar energy and wind energy, respectively. Wind turbine 40 is arranged by a suitable bearing 50 to rotate in the horizontal plane about three hundred sixty degrees. Turbine 40 includes at least one vane 52 adapted to direct wind advantageously across blades 54. Vane 52 is configured to orient turbine 40 to face into the wind. Conductors 58, 60 conduct electrical power derived from generator 56 and photovoltaic cells 62 of solar array panels 30 to an electrical power sub-system where generated power may be stored or immediately utilized (FIG. 11).

In an alternative embodiment, the electricity from wind turbine 40 can be utilized to run a water pump 64 (FIG. 9) which can then be used to place water behind a storage dam. When the wind has stopped, one simply releases the water from the reservoir through a conventional hydroelectric mechanism (not shown) to produce whatever electricity is required. This process can and does work if wind turbines 40 are situated next to an existing dam. Otherwise, this arrangement may be an impractical and expensive method of storing wind energy for later production of electricity.

In another embodiment, the portable renewable energy generator system 10 is configured to generate continuous power from the combined generation of electricity from both the wind turbine 40 and solar panel arrays 30 to power a ½ hp water pump. In the event of a total absence of natural resources, the system is configured to provide at least three days of power reserve from the fully charged batteries (e.g., a battery bank large enough to produce ½ horsepower for three days from a full charge assuming no wind or solar power input).

With this configuration, the portable renewable energy generator system 10 can produce ½ hp of continuous power, typically at 8 amps and a demand load of 2.3 kilowatt.hr/day. Given ambient environmental conditions at the site it was designed for (e.g., Schenectady, N.Y.), the average theoretical power output was estimated to be about 3.5 kw.hr/day, with roughly ⅓ of that coming from the solar array panels 30. During initial testing runs, the portable renewable energy generator system 10 was capable of supporting the operation of a ½ hp, 8 amp pump continuously during extended pumping tests of up to 240 hours, with energy production exceeding demand during this period. In addition, the portable renewable energy generator system 10 is able to satisfy other small power needs (e.g., groundwater sampling pumps, etc.) when the current system 10 demand is not utilizing available power.

In an exemplary embodiment and still referring to FIG. 9, turbine 40 is a Whisper 175 48 VDC wind turbine with an EZ1 controller 56. Turbine 40 and tower assembly 36 are erected onto tower base 34 using a simple rope and pulley system (not shown). Once erected, the tower assembly 36 is supported by guy wires 66 anchored to the ground shown generally at 68. In one embodiment, a seventy foot schedule 40 galvanized pipe tower assembly 36 is used with guy wires 66 to extend and maintain turbine 40 above the tree line about seventy feet above land surface. In this embodiment, a weight of the tower assembly 36 is primarily due to a choice of tower pipe material. It is envisioned that alternate materials such as aluminum or fiberglass reinforced plastic can be used. Furthermore, it is envisioned that a tressel could be substituted for the galvanized pipe. It will be recognized by one skilled in the pertinent art that turbine 40 is elevated above surrounding trees and other obstacles to optimize the ability of blades 54 to utilize available wind energy.

Referring now to FIG. 10, as well as to FIGS. 3–9, a racking structure for each of the two solar panel arrays 30 is shown generally at 70. The racking structure 70 includes a plurality, suitably about eight, adjustable panel support braces 72 and corresponding number of frame members 76 supporting solar panel array 30. Each adjustable panel support brace pivotally extends from a corresponding support member 26 opposite a respective support member 26 hingedly attached to a lower edge 74 defining a lower solar panel array 30 as illustrated in FIG. 10.

The adjustable panel support braces 72 are fabricated of a metal "C" channel or box cross section, for example, but not limited thereto, as is best seen in FIG. 10. Each support brace 72 extends to and is pivotally coupled at one end to a corresponding frame member 76 of rack structure 70 disposed transversely across the back of each of the two solar panel arrays 30 to provide support for the same. At an opposite end, each brace 72 is arranged to freely pivot about its attachment to a corresponding support member 26 in a direction perpendicular to the longitudinal trailer axis. The free end of each support member 26 is formed as a yoke for connection to a corresponding brace 72 in a clevis type arrangement to hold the deployed solar panel at the desired angle as will be described in more detail later. The adjustable braces 72 each include a separable extension rail 78 connected through a pin 80 extending therethrough so that the length of all may be adjusted or separated for folding the solar array panels 30 and transport of the trailer 12. A compartment or holding strip (not shown) may be provided along on chassis 16 to secure the extension rails 78 and corresponding pins 80 of the panel support braces 72 during transport. It will be recognized by one skilled in the pertinent art that each support member 26 extending from one side of chassis 16 is configured to pivotally couple with two panel support braces 72, one for a lower solar panel array and the other for the upper solar panel array 30 as illustrated in FIGS. 9 and 10.

Figure 6:
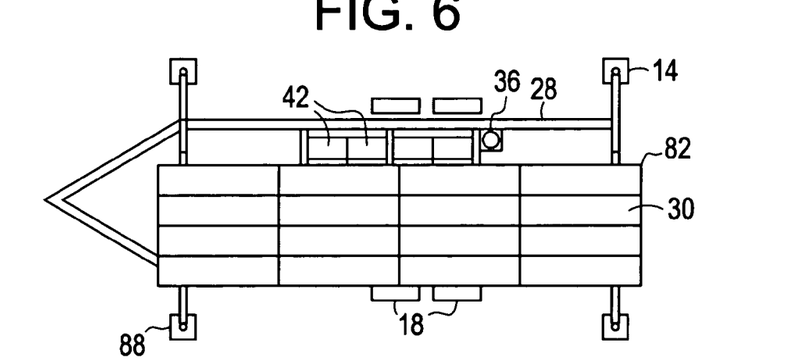
FIG. 6 is a top view of the trailer in the standing position including a tower assembly erected on the tower base plate and a solar array disposed over the battery boxes with covers removed showing batteries disposed therein.

Turning now to FIGS. 6–10 there is shown the racking structure with solar panels mounted thereon in various stages of deployment. As is best seen in FIGS. 6 and 10, an exemplary embodiment of this invention utilizes two solar panel arrays or sections 30, a lower panel section 81 and a top panel section 82. Each panel section is made up of a plurality of individual solar cells, preferably high efficiency, single crystal cells such as those including sixteen Sharp NE-Q5E2U 165 watt 24 volts solar panels, arranged in columns and rows to form a modular panel section. The panel sections are securely mounted upon the racking structure that was described earlier. However, it will be recognized that other racking structures are contemplated suitable to the desired end purpose. All of the panel sections are of the same length and width as illustrated, but some or all of the sections may differ in length and width. Both the length and width of the panel sections are proportioned to the size of the trailer that carries the racking structure. A trailer that is suitable for use in this invention may, for example, be about ten to about twelve feet long, six feet wide, and about two feet high, but other dimensions are also contemplated suitable for the desired end purpose. Both the lower and top panel sections 81, 82 for that particular trailer would then be about five feet wide and about eight feet long. In an alternative embodiment, the solar panels, arranged as described above, may be connected to a solar tracking device such that the optimum angle is maintained between incident solar radiation and the panels for efficient capture of the sun's natural energy. Two basic kinds of tracking structures are contemplated: one-axis and two-axis. The one-axis trackers are typically designed to track the sun from east to west. They are used with flat-plate systems and sometimes with concentrator systems. The two-axis type is used primarily with PV concentrator systems. These units track the sun's daily course, but also, its seasonal course between the northern and southern hemispheres.

Referring now to FIGS. 7 and 8, the solar panel sections are depicted in a fully stowed, or transport, mode. Lower and upper panel sections 81, 82 are folded upon each other about hinge 44 incorporated in frame members 76 supporting each section 81, 82 and lie flat across the battery boxes 22. Deployment of the panel sections to form a planar array is carried out stepwise. As is shown in FIGS. 9 and 10, the lower panel section 81 is pivoted about lower edge 46 and secured in a position to catch incident light from the sun. Next, the top panel section 82 is unfolded or pivoted about hinge 44 and deployed substantially parallel to the lower panel section 81 to form a planar array that is disposed at an angle to the horizontal across the top of the trailer.

As is illustrated in FIGS. 9 and 10, the entire planar array or individual sections 81, and 82 may be then tilted to an angle that provides optimum interception of incident solar radiation by pivoting the array about lower edge 46 and/or hinge 44. The panel array is secured at an angle to the horizontal by connecting the yoke ends of support members 26 opposite support members 26 hingedly attached to lower edge 46 of the lower panel section 81 to a corresponding adjustable panel support braces 78 using a pin or bolt 84 to effect a proper length of brace 72.

The angle that the planar array makes with the horizontal is determined by the length of upper support braces 72 leading to corresponding top panel section 82. Each brace 78 is configured with separable extension rail 78 as an inner leg that is slidably insertable into a corresponding outer leg 86 pivotally attached to panel section 82 via a respective frame member 76. The length of support brace 72 is changed by sliding the inner leg 78 thereof in and out within the outer leg 86. As can readily be seen from FIG. 10, changing the length of brace 72 also changes the angular position of panel section 82 that make up the planar array. Inner leg 78 and outer leg 86 are provided with a plurality of holes along much of their lengths, and the holes are placed so that holes within the inner leg can be collimated with respect to those in the outer leg. The removable pin 80 is then inserted through a set of collimated holes to fix the position of inner leg 78 relative to that of the outer leg 86, and thus establish the length of support brace 72. In like manner, a second group of lower support braces 72 extend between the side of the trailer to a corresponding support member 26 and lower panel section 81 via a respective frame member 76 aligned therewith to support the lower part of the panel array. Lower support braces 72 are like upper support braces 78 described above except that they are somewhat shorter in length.

Referring again to FIGS. 1–10, there is also illustrated certain features that enhance the performance of the portable renewable energy generator system 10 under adverse conditions. Wind striking against the large surface area of the deployed solar cell array can create large tipping forces. In those circumstances, the trailer can be braced against tipping by providing stabilizing jacks 14 at each trailer corner. Jacks 14 may be mounted on telescoping support members 86 that can be extended outwardly at the deployment site to provide a greater support base for the trailer. Each jack 14 has a base 88 that is raised up and down through a screw turned by crank 90 to adjust to uneven terrain. Tower assembly 36 is optionally configured as an extendable mast that may be provided for mounting a radio or microwave antenna. Chassis 16 may be configured for connection to lifting means such as a crane or helicopter.

Referring now to FIG. 11, a schematic diagram of a portable renewable energy generator system 10 is illustrated generally at 100. Solar panel array 30 includes sixteen photovoltaic cells 62 electrically connected in series or parallel to each other and electrically coupled to a combiner 102. Combiner 102 is in turn electrically coupled with a controller 104. In an exemplary embodiment controller 104 is a C40 48 volt 40 amp charge controller. Controller 104 is electrically coupled to conductors 58, 60 which is electrically coupled to a battery bank 124 of twenty-four PVX2580L Concord AGM 12 volt batteries 42 which are also electrically coupled to wind generator controller 56 via conductors 58, 60, as discussed above. Conductors 58 and 60 are in further electrical communication with an inverter 106 where electrical communication from conductor 60 to inverter 106 is via a fuse 108. Power generated from either the wind turbine 40 or solar panel array 30 is supplied through DC combiner box 102 to inverter 106. Inverter 106 is optionally electrically connected to a backup generator 110. Inverter 106 is configured to convert DC from the battery bank 124 to AC, while also converting AC from the backup generator 110 to DC for charging the battery bank 124. A heat dissipater may be included to minimize overcharging the battery bank 124 generally indicated in phantom at 112.

In an exemplary embodiment, combiner 102 is a 10-1 combiner box while inverter 106 is a SW4048 4000 watt 48 VDC input inverter operably connected to a 300 amp fuse 108. However, other inverters, combiners, and fuses are contemplated suitable for the desired end purpose.

Backup generator 110 includes any backup carbon fueled electricity generator that may also be automatically actuated to power needed operations energy and battery charging capability whenever any utility supplied electricity is interrupted, not present, or when power generated by the photovoltaic cells and/or wind powered generator is insufficient to maintain system operation. In an exemplary embodiment, backup generator is a backup liquid propane (LP) generator with variable generating capacity (e.g., 3,000–8,000 Watt capacity). Alternatively, it is contemplated that a backup generator 110 includes a fuel cell that may be employed instead of a carbon fueled electricity generator.

Referring again to FIG. 4, various box compartments or housings are depicted for the electrical components of FIG. 11. A box 136 for inverter 106 is shown disposed in chassis 16 toward a front right corner and a box 144 for controller 104 is shown in a middle portion of chassis in front of battery boxes 22. In like manner, boxes 146 and 150 are disposed behind battery boxes 22 for wind generator controller 56 and backup generator 110, respectively. In addition, a box 152 may be disposed with chassis 16 in front of box 150 for heat dissipater 112.

The above described mobile trailer is configured to carry all the components of the portable renewable energy generator system, either attached or stored on the trailer such that the trailer can be deployed at any number of remote locations where power generation is necessary. The trailer is constructed in accordance with standard roadway trailer specifications in order for it to be legally operated on roadways if necessary. The trailer also includes a low profile in a transport position minimizing air drag during roadway transport. The standing height transport position is less than about three feet from the ground. Once a site is selected for power generation, the portable renewable energy generator system can be deployed. The trailer can be stabilized by extending support jacks depending from four corners defining the trailer, and the solar panel arrays and wind turbine units can be assembled and erected for the purpose of producing a mobile source of renewable energy. Variable power production for most geographic locations is possible on the existing trailer platform described above by changing the solar array configuration and wind turbine generation capacity.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A portable renewable energy generator comprising:
   a movable platform, said movable platform adapted for one of towing and transport to a remote area;
   a redundant renewable energy source generator including a wind energy extraction device, said redundant renewable energy source generator configured for transport on said movable platform, wherein said wind energy extraction device is rotatable about a connection to said moveable platform; and
   a battery system operably connected to said redundant renewable energy source generator, said battery system configured to store electrical energy generated by said redundant renewable energy source generator.

2. The generator of claim 1, wherein said wind energy extraction device includes a wind turbine.

3. The generator of claim 1 including stabilizing jacks positioned at each corner defining said movable platform, each of said jacks mounted on an outwardly extendable support member and having an adjustable base to adjust to uneven terrain.

4. The generator of claim 1, further comprising:
   at least one compartment box attached to said movable platform to house components associated with said battery system and power generation for transport.

5. A method for production of continuous power from a renewable energy source, the method comprising:
   configuring a mobile platform for one of towing and transport to a remote area;
   disposing a redundant renewable energy source generator including a wind energy extraction device on said movable platform, wherein said wind energy extraction device is rotatable about a connection to said moveable platform; and
   disposing a battery system on said mobile platform, said battery system operably connected to said redundant renewable energy source generator, said battery system configured to store electrical energy generated by said redundant renewable energy source generator.

6. The method of claim 5, wherein said wind energy extraction device includes a wind turbine.

7. The method of claim 5 including:
   positioning stabilizing jacks at each corner defining said mobile platform, each of said jacks mounted on an outwardly extendable support member and having an adjustable base to adjust to uneven terrain.

* * * * *